(12) United States Patent
Ohmori

(10) Patent No.: US 12,393,106 B2
(45) Date of Patent: Aug. 19, 2025

(54) LENS APPARATUS AND IMAGING APPARATUS

(71) Applicant: CANON KABUSHIKI KAISHA, Tokyo (JP)

(72) Inventor: Katsumi Ohmori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 17/835,427

(22) Filed: Jun. 8, 2022

(65) Prior Publication Data

US 2022/0299847 A1  Sep. 22, 2022

Related U.S. Application Data

(63) Continuation of application No. 16/207,248, filed on Dec. 3, 2018, now Pat. No. 11,385,528.

(30) Foreign Application Priority Data

Dec. 6, 2017 (JP) .................................. 2017-234296

(51) Int. Cl.
G02B 7/02 (2021.01)
G03B 17/12 (2021.01)
G03B 17/56 (2021.01)

(52) U.S. Cl.
CPC ........... *G03B 17/561* (2013.01); *G03B 17/12* (2013.01)

(58) Field of Classification Search
CPC .................. G03B 17/561; G03B 17/12; F16C 29/04–0697; F16D 3/16–48
USPC .................... 348/375; 359/818, 819; 396/529
See application file for complete search history.

(56) References Cited

U.S. PATENT DOCUMENTS

| 2,596,746 | A | 5/1952 | Waller |
| 8,072,698 | B2 | 12/2011 | Sugita |
| 8,564,893 | B2 | 10/2013 | Sugita |
| 2011/0092298 | A1 | 4/2011 | Sakai |
| 2018/0275491 | A1 | 9/2018 | Shinano et al. |
| 2018/0321461 | A1* | 11/2018 | Hasegawa ................ G02B 7/04 |

FOREIGN PATENT DOCUMENTS

| JP | S55042888 U | 3/1980 |
| JP | H09113975 A | 5/1997 |
| JP | H10186200 A | 7/1998 |
| JP | 2000329994 A | 11/2000 |
| JP | 2003153046 A | 5/2003 |

(Continued)

OTHER PUBLICATIONS

Non-Final Office Action issued in U.S. Appl. No. 16/207,248 mailed on Jun. 22, 2020.

(Continued)

*Primary Examiner* — Mahidere S Sahle
(74) *Attorney, Agent, or Firm* — ROSSI, KIMMS & McDOWELL LLP

(57) ABSTRACT

A lens apparatus includes a tripod mount, a cylindrical member supported rotatably around an optical axis on the tripod mount, a roller housed in the tripod mount and including a rolling bearing and a shaft member engaged with the rolling bearing, a roller holding member configured to rotatably hold the roller, and a biasing member configured to bias the roller against the cylindrical member via the roller holding member.

22 Claims, 3 Drawing Sheets

(56) References Cited

FOREIGN PATENT DOCUMENTS

| JP | 2011008085 A | | 1/2011 |
|---|---|---|---|
| JP | 2012047898 A | * | 3/2012 |
| JP | 2013125169 A | | 6/2013 |

OTHER PUBLICATIONS

Final Office Action issued in U.S. Appl. No. 16/207,248 mailed on Dec. 10, 2020.
Non-Final Office Action issued in U.S. Appl. No. 16/207,248 mailed on May 13, 2021.
Notice of Allowance issued in U.S. Appl. No. 16/207,248 mailed on Aug. 25, 2021.
Notice of Allowance issued in U.S. Appl. No. 16/207,248 mailed on Mar. 22, 2022.
Office Action issued in Japanese Appln. No. 2017-234296 mailed on Sep. 14, 2021. English translation provided.
Office Action issued in Japanese Appln. No. 2021-199332 mailed on Dec. 6, 2022. English translation provided.
Office Action issued in Japanese Appln. No. 2021-199332 mailed Sep. 13, 2022. English machine translation provided.

* cited by examiner

LENS APPARATUS AND IMAGING APPARATUS

BACKGROUND OF THE INVENTION

Field of the Invention

The present invention relates to a lens apparatus and an imaging apparatus having a tripod mount.

Description of the Related Art

A conventional lens apparatus has a revolving mechanism for rotating a lens barrel around the optical axis in an optical system. For example, a lens apparatus having a tripod mount can easily change the longitudinal and lateral composition by rotating the lens and the camera around the optical axis while the tripod mount is fixed onto the tripod.

The revolving mechanism includes a portion (simply referred to as a "click" hereinafter) that provides a click feeling for each specific rotation phase so that the user can recognize the rotational position of the lens through the click feeling. In particular, the lens apparatus having the tripod mount includes click portions in the gravity direction when the lens apparatus is horizontally attached to the tripod, and often provides clicks for every 90° phase. In general, the click feeling is provided by biasing a ball, a pin, a roller or the like pressed by a biasing member on the fixed part side, such as the tripod mount, against a recessed groove provided on the lens body side.

Japanese Patent Laid-Open No. ("JP") 2012-47898 discloses a lens apparatus that can adjust the click position in revolving.

The lens apparatus disclosed in JP 2012-47898 ca bias the roller supported on the tripod mount unit against the lens apparatus body through a biasing spring, and the outer circumferential surface of the roller contacts the lens apparatus body and a washer member. Hence, depending on the biasing force of the biasing spring, when the lens apparatus body is revolved relative to the tripod mount unit, the roller slides without rotating relative to the lens apparatus body. The roller sliding on the lens apparatus body is likely to wear the lubricating coating applied to the contact portion with the roller in the lens apparatus body and the contact component. Repetitive revolving will generate the abrasion powder through abrasions, peel the lubricating coating, and degrade the operability such as the feeling and torque in the revolving.

SUMMARY OF THE INVENTION

The present invention provides a lens apparatus and an imaging apparatus having a revolving mechanism with an improved durability.

A lens apparatus according to one aspect of the present invention includes a tripod mount, a cylindrical member supported rotatably around an optical axis on the tripod mount, a roller housed in the tripod mount and including a rolling bearing and a shaft member engaged with the rolling bearing, a roller holding member configured to rotatably hold the roller, and a biasing member configured to bias the roller against the cylindrical member via the roller holding member.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 2:
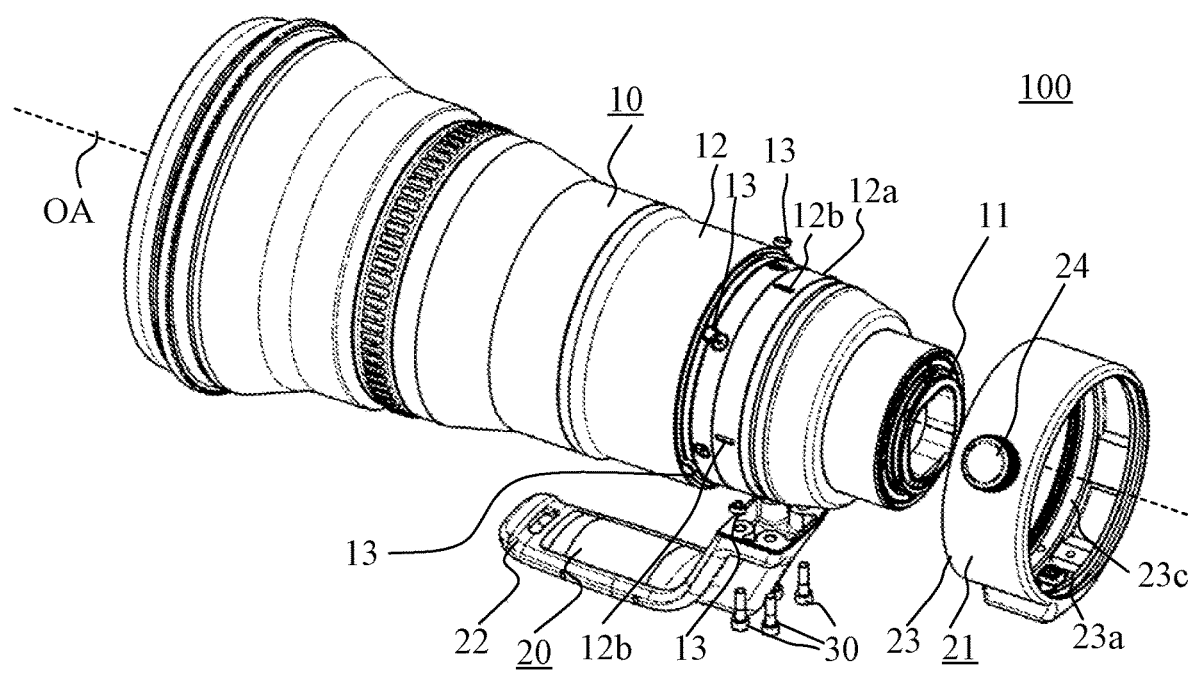
FIG. 2 is an exploded perspective view of the lens apparatus according to the first embodiment.

Referring now to FIG. 2, a description will be given of a lens apparatus (lens barrel) according to a first embodiment of the present invention. FIG. 2 is an exploded perspective view of the lens apparatus 100. The lens apparatus 100 is an interchangeable lens attachable to and detachable from the imaging apparatus body.

The lens apparatus 100 includes a barrel body 10 configured to hold an optical system (lens), and a tripod mount unit 20 configured to support the barrel body 10 integrally with a camera (imaging apparatus body, camera body) so that the barrel 10 can rotate at a fixed position. The lens barrel body 10 includes a mount member 11 for detachably attaching the lens apparatus 100 to the camera. The mount member 11 is fixed onto an exterior ring (cylindrical member) 12 rotatably supported around an optical axis OA on the tripod mount 22 by a screw or the like.

The tripod mount unit 20 includes a tripod mount ring unit 21 and a tripod mount 22 having a screw portion 22a (see FIG. 1A) engaged with a tripod screw. The tripod mount ring unit 21 includes a tripod mount ring 23 having a diameter engagement portion with the exterior ring 12, and a lock knob 24 attached to the tripod mount ring 23. The tripod mounting ring 23 has a roller housing portion 23a. The roller housing portion 23a houses a roller 25, a roller holding member 26, a biasing member 27, a guide member 28, and a press plate 29 (see FIG. 1B). This will be described in detail later.

In incorporating the tripod mount unit 20 into the barrel body 10, the tripod mount ring unit 21 is first inserted from the backside (image side) of the barrel body 10, and the roller 13 is inserted into the hole portion 23b in the tripod mount ring 23 (See FIG. 1B) at a predetermined position. The roller 13 is screwed onto the exterior ring 12. At least three rollers 13 are provided, and the tripod mounting ring unit 21 is rotated, incorporated at a predetermined phase, and fixed onto the exterior ring 12. The tripod mounting ring 23 has an engaging groove 23c for the roller 13 and the engaging groove 23c determines the position of the tripod mount ring unit 21 in the optical axis direction. Next, the tripod mount 22 is fixed onto the tripod mount ring unit 21 by a screw 30. Thereby, the tripod mount unit 20 is completely incorporated into the barrel body 10.

When the screw portion 22a of the tripod mount 22 is fixed onto the tripod screw, the barrel body 10 becomes rotatable at a fixed position relative to the tripod mount unit 20. Thereby, an image can be captured while the camera is revolved. A relative rotation between the lens barrel body 10 and the tripod mount unit 20 can be suppressed by fastening the lock knob 24.

Figure 1A:
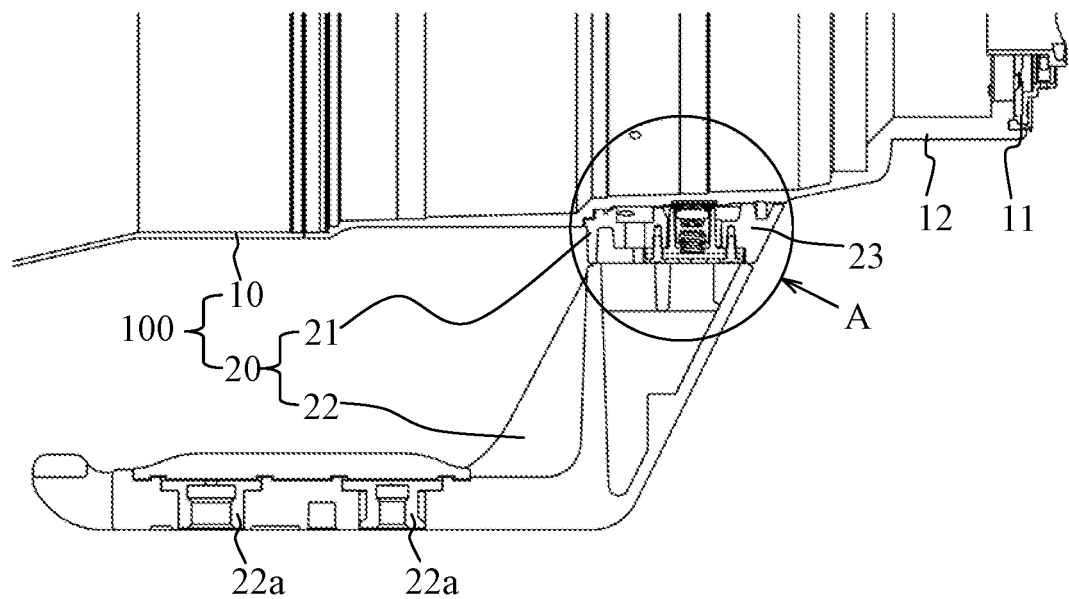
FIGS. 1A and 1B are sectional views of a principal part in a lens apparatus according to a first embodiment.
Figure 1B:
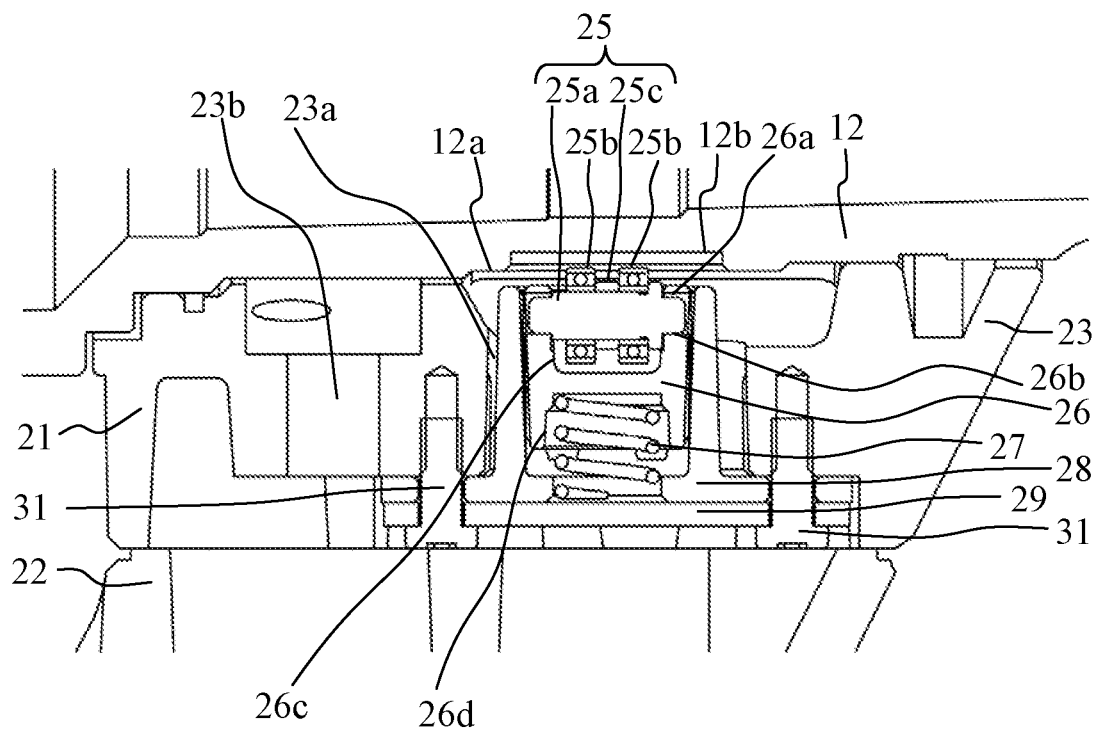

Referring now to FIGS. 1A and 1B, a description will be given of the roller housing portion 23a in the tripod mounting ring 23. FIG. 1A is a sectional view of principal part in the lens apparatus 100, and FIG. 1B is an enlarged view of an area A in FIG. 1A. As illustrated in FIG. 1B, the roller 25 includes a shaft member 25a, a rolling bearing 25b, and a spacer 25c. The shaft member 25a is engaged with the groove portion 26a on the roller holding member 26. The roller holding member 26 contacts the biasing member 27 and the biasing force biases the roller 25 against the exterior ring 12. The roller holding member 26 is engaged with the guide member 28 and guided so as to move back and forth in a direction (vertical direction in FIG. 1B) corresponding to the biasing direction of the biasing member 27. The biasing member 27 also contacts the holding plate 29, and is fixed by fastening the holding plate 29 and the guide member 28 with the tripod mount ring 23 by a screw 31 together. Thereby, the roller 25 is housed in the roller housing portion 23a of the tripod mounting ring 23.

The shaft member 25a in the roller 25 is engaged with the inner ring of the rolling bearing 25b, contacts the contact portion 26b in the roller holding member 26, and receives the biasing force from the biasing member 27. The outer ring of the rolling bearing 25b in the roller 25 is forced against the exterior ring 12 under the biasing force of the biasing member 27. In other words, the biasing force of the biasing member 27 acts between the shaft member 25a and the contact portion 26b of the roller holding member 26, between the inner ring of the shaft member 25a and the rolling bearing 25b, and between the outer ring of the rolling bearing 25b and the exterior ring 12.

As the lens barrel body 10 is rotated relative to the tripod mount unit 20, the roller holding member 26 receives the shaft member 25a of the roller 25 and thus the frictional force applied to the outer ring of the rolling bearing 25b becomes small. Therefore, the exterior ring of the rolling bearing 25b reliably rotates without slipping on the exterior ring 12. This configuration can prevent the abrasion powder from being generated by the slippage between the exterior ring and the roller. Hence, a lens apparatus with an enhanced durability in revolving can be provided.

A rolling contact surface 12a on the exterior ring 12 with the roller 25 has a plurality of concave (or recessed) portions 12b. When the lens barrel body 10 is rotated relative to the tripod mount unit 20, the roller 25 falls into the concave portion 12b, is biased against, and contacts a chamfered portion of the concave portion 12b. Thereby, the user can obtain a click feeling. For example, the concave portion 12b has a phase for obtaining a click feeling and a phase shifted by 90° from the phase when the camera (or the lens barrel body 10) is horizontal to the tripod mount unit 20. Thereby, the user can easily switch between image capturing in the normal state and so-called image capturing at a vertical position.

This embodiment receives the biasing force from the biasing member 27 at both ends of the shaft member 25a and the roller holding member 26. Hence, when the roller 25 falls into the concave portion 12b, the roller 25 is prevented from contacting the chamfered portion of the concave portion 12b while the shaft of the roller 25 is inclined. Therefore, since a load is uniformly applied to the contact surface between the roller 25 and the chamfered portion of the concave portion 12b, the contact surface can be prevented from being worn.

According to this embodiment, the roller holding member 26 has an H shape on a section (illustrated in FIG. 1B) including the optical axis OA in the lens. The roller holding member 26 has a first concave portion 26c and a second concave portion 26d, and at least part of the rolling bearing 25b is disposed inside the first concave portion 26c, and at least part of the biasing member 27 is disposed inside the second concave portion 26d. This configuration increases the contact area between the roller holding member 26 and the guide member 28 that guides the roller holding member 26 along the vertical direction in FIG. 1B, and makes compact the (vertical size) of the tripod mounting ring 23.

Second Embodiment

Figure 3:
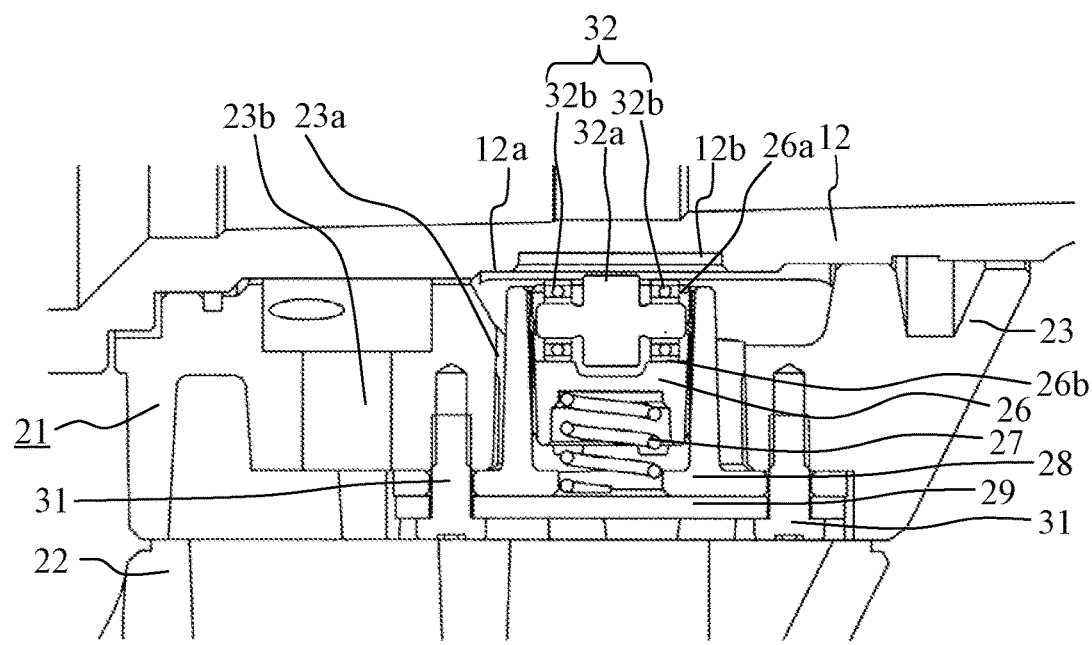
FIG. 3 is a sectional view of a principal part in a lens apparatus according to a second embodiment.

Referring now to FIG. 3, a description will be given of a lens apparatus (lens barrel) according to a second embodiment of the present invention. FIG. 3 is a sectional view of principal part of the lens apparatus according to this embodiment.

In the lens apparatus according to the first embodiment, the shaft member 25a in the roller 25 is engaged with the roller holding member 26, and the rolling bearing 25b rolls on the exterior ring 12. On the other hand, in the lens apparatus according to this embodiment, the roller bearing 32b in the roller 32 is engaged with the roller holding member 26, and the roller body 32a rolls on the exterior ring 12. Those elements having the same functions or roles in this embodiment as those in the first embodiment are designated by the same reference numerals, and a description thereof will be omitted.

FIG. 3 is a sectional view near the exterior ring 12 and the roller housing portion 23a in the tripod ring 23, and similar to the first embodiment, the roller housing portion 23a houses a roller 32, a roller holding member 26, a biasing member 27, a guide member 28, and a holding plate 29. The roller 32 includes a shaft member 32a as a roller body and a rolling bearing 32b, and both ends of the shaft member 32a (shaft portions at both ends of the roller body) and the inner ring in the rolling bearing 32b are engaged with each other. The outer ring in the rolling bearing 32b is engaged with the groove portion 26a of the roller holding member 26, contacts the contact portion 26b of the roller holding member 26, and receives the force from the biasing member 27. Hence, the biasing force from the biasing member 27 acts between the exterior ring in the rolling bearing 32b and the contact portion 26b in the roller holding member 26, between the inner ring in the rolling bearing 32b and the shaft member 32a, and between the shaft member 32a and the exterior ring 12.

When the lens barrel body 10 is rotated relative to the tripod mount unit 20 in this state, the frictional force acting the roller body 32a is small because the roller holding member 26 receives the rolling bearing 32b of the roller 32 and the inner ring in the rolling bearing 32b and the shaft portions at both ends of the roller body 32a are engaged with each other. The roller body 32a reliably rotates without slipping relative to the exterior ring 12. Similar to the first embodiment, this configuration can prevent from being generated the abrasion powder caused by the slippage between the exterior ring and the roller. Hence, a lens barrel with an enhanced durability of revolving can be provided.

Third Embodiment

Figure 4:
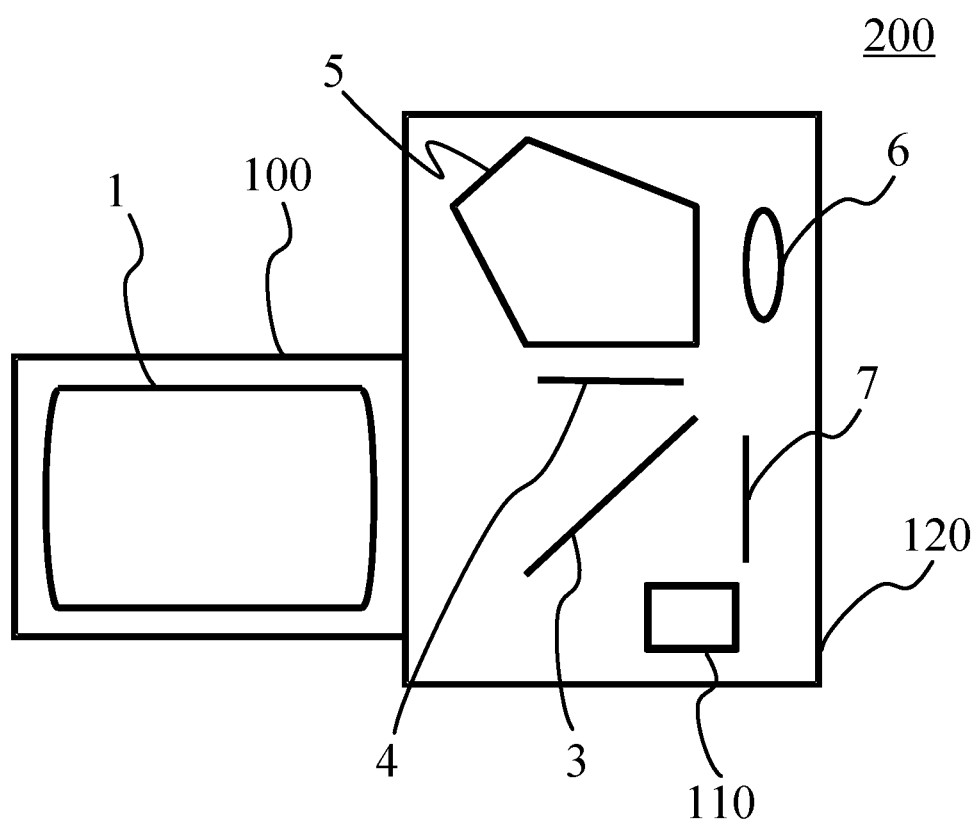
FIG. 4 is a structural view of an imaging apparatus according to a third embodiment.

Referring now to FIG. 4, a description will be given of an imaging apparatus according to a third embodiment of the present invention. FIG. 4 is a configuration diagram of an imaging apparatus 200 (single-lens reflex camera). In FIG. 4, the lens apparatus 100 (interchangeable lens) includes an imaging optical system 1 (lens unit). The camera body 120 (imaging apparatus body) includes a quick return mirror 3, a focus screen 4, a Penta roof prism 5, an eyepiece lens 6, and the like. The quick return mirror 3 upwardly reflects a light flux formed via the imaging optical system 1. The focus screen 4 is disposed at the image forming position of the imaging optical system 1. The Penta roof prism 5 converts an inverse image formed on the focus screen 4 into an erect image. The user can observe the erect image through the eyepiece 6.

An image sensor 7 includes a CCD sensor and a CMOS sensor, photoelectrically converts an optical image (object image) formed via the imaging optical system 1, and outputs image data. In image capturing, the quick return mirror 3 is retracted from the optical path, and an optical image is formed on the image sensor 7 via the imaging optical system 1. A control unit 110 has a CPU and controls the operation of each unit of the imaging apparatus 200.

The imaging apparatus 200 includes, but is not limited to, the camera body 120 having the image sensor 7 and the lens apparatus 100 detachably attached to the camera body 120. It may be an imaging apparatus in which a camera body and a lens apparatus are integrated with each other, or a mirrorless single-lens reflex camera (mirrorless camera) having no quick return mirror.

Each embodiment can provide a lens barrel and an imaging apparatus with an enhanced durability of the revolving mechanism.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-234296, filed on Dec. 6, 2017, which is hereby incorporated by reference herein in its entirety.

What is claimed is:

1. A lens apparatus comprising:
a lens barrel configured to hold a lens; and
a supporting member configured to support the lens barrel rotatably around an optical axis, and including:
a rolling bearing that contacts the lens barrel;
a shaft member engaged with the rolling bearing;
a holding member configured to hold the shaft member; and
a biasing member configured to bias the holding member that causes the holding member to contact the shaft member and bias the rolling bearing against the lens barrel in a biasing direction of the biasing member,
wherein the rolling bearing and the holding member are arranged at a distance from each other.

2. The lens apparatus according to claim 1, wherein the holding member has an H shape on a section including the optical axis in the lens.

3. The lens apparatus according to claim 2, wherein:
the holding member includes a first concave portion and a second concave portion,
at least part of the rolling bearing is disposed inside the first concave portion, and
at least part of the biasing member is disposed inside the second concave portion.

4. The lens apparatus according to claim 1, wherein the lens barrel includes a plurality of concave portions on a surface that contacts the rolling bearing.

5. The lens apparatus according to claim 1, further comprising a guide member configured to guide the holding member so that the holding member is movable back and forth in a direction corresponding to the biasing direction of the biasing member.

6. The lens apparatus according to claim 5, further comprising:
a press plate that contacts the biasing member,
wherein the guide member and the press plate are fastened together by a screw.

7. A lens apparatus comprising:
a lens barrel configured to hold a lens; and
a supporting member configured to support the lens barrel rotatably around an optical axis, and including:
a shaft member that contacts the lens barrel;
a rolling bearing with which the shaft member is engaged;
a holding member configured to hold the rolling bearing; and
a biasing member configured to bias the holding member that causes the holding member to contact the rolling bearing and bias the shaft member against the lens barrel in a biasing direction of the biasing member,
wherein the shaft member and the holding member are arranged at a distance from each other.

8. The lens apparatus according to claim 7, wherein the holding member has an H shape on a section including the optical axis in the lens.

9. The lens apparatus according to claim 8, wherein:
the holding member includes a first concave portion and a second concave portion,
at least part of the rolling bearing is disposed inside the first concave portion, and
at least part of the biasing member is disposed inside the second concave portion.

10. The lens apparatus according to claim 7, wherein the lens barrel includes a plurality of concave portions on a surface that contacts the shaft member.

11. The lens apparatus according to claim 7, further comprising a guide member configured to guide the holding member so that the holding member is movable back and forth in a direction corresponding to the biasing direction of the biasing member.

12. The lens apparatus according to claim 11, further comprising:
a press plate that contacts the biasing member,
wherein the guide member and the press plate are fastened together by a screw.

13. A supporting member configured to support a lens barrel rotatably around an optical axis, the lens barrel being configured to hold a lens, the supporting member comprising:
a rolling bearing that contacts the lens barrel;
a shaft member engaged with the rolling bearing;
a holding member configured to hold the shaft member; and
a biasing member configured to bias the holding member that causes the holding member to contact the shaft member and bias the rolling bearing against the lens barrel in a biasing direction of the biasing member,
wherein the rolling bearing and the holding member are arranged at a distance from each other.

14. The supporting member according to claim 13, wherein the holding member has an H shape on a section including the optical axis in the lens.

15. The supporting member according to claim 14, wherein:
   the holding member includes a first concave portion and a second concave portion,
   at least part of the rolling bearing is disposed inside the first concave portion, and
   at least part of the biasing member is disposed inside the second concave portion.

16. The supporting member according to claim 13, further comprising a guide member configured to guide the holding member so that the holding member is movable back and forth in a direction corresponding to the biasing direction of the biasing member.

17. The supporting member according to claim 16, further comprising:
   a press plate that contacts the biasing member,
   wherein the guide member and the press plate are fastened together by a screw.

18. A supporting member configured to support a lens barrel rotatably around an optical axis, the lens barrel being configured to hold a lens, the supporting member comprising:
   a shaft member that contacts the lens barrel;
   a rolling bearing with which the shaft member is engaged;
   a holding member configured to hold the rolling bearing; and
   a biasing member configured to bias the holding member that causes the holding member to contact the rolling bearing and bias the shaft member against the lens barrel in a biasing direction of the biasing member,
   wherein the shaft member and the holding member are arranged at a distance from each other.

19. The supporting member according to claim 18, wherein the holding member has an H shape on a section including the optical axis in the lens.

20. The supporting member according to claim 19, wherein:
   the holding member includes a first concave portion and a second concave portion,
   at least part of the rolling bearing is disposed inside the first concave portion, and
   at least part of the biasing member is disposed inside the second concave portion.

21. The supporting member according to claim 18, further comprising a guide member configured to guide the holding member so that the holding member is movable back and forth in a direction corresponding to the biasing direction of the biasing member.

22. The supporting member according to claim 21, further comprising:
   a press plate that contacts the biasing member,
   wherein the guide member and the press plate are fastened together by a screw.

* * * * *